United States Patent
Tester

(10) Patent No.: US 7,010,714 B1
(45) Date of Patent: Mar. 7, 2006

(54) PRESCALER ARCHITECTURE CAPABLE OF NON INTEGER DIVISION

(75) Inventor: David P. Tester, Preston (GB)

(73) Assignee: LSI Logic Corporation, Milpitas, CA (US)

( * ) Notice: Subject to any disclaimer, the term of this patent is extended or adjusted under 35 U.S.C. 154(b) by 642 days.

(21) Appl. No.: 09/981,474

(22) Filed: Oct. 17, 2001

(51) Int. Cl.
*G06F 1/04* (2006.01)
*H03K 23/00* (2006.01)

(52) U.S. Cl. .......................... 713/500; 331/2; 327/115
(58) Field of Classification Search ................ 713/500, 713/501, 502; 377/47, 48; 327/113, 115, 327/117; 331/16, 2, 34
See application file for complete search history.

(56) References Cited

U.S. PATENT DOCUMENTS

| | | | | |
|---|---|---|---|---|
| 4,851,787 A | * | 7/1989 | Martin | 331/1 A |
| 5,714,896 A | * | 2/1998 | Nakagawa et al. | 327/115 |
| 5,859,890 A | * | 1/1999 | Shurboff et al. | 377/48 |
| 5,889,436 A | * | 3/1999 | Yeung et al. | 331/2 |
| 5,970,110 A | * | 10/1999 | Li | 377/48 |
| 6,424,192 B1 | * | 7/2002 | Lee et al. | 327/156 |
| 6,583,674 B1 | * | 6/2003 | Melava et al. | 331/16 |

FOREIGN PATENT DOCUMENTS

JP      08204556 A  *  8/1996

OTHER PUBLICATIONS

Ahola et al, A 4 GHz CMOS Multiple Module Prescaler, 1998, IEEE, pp. 323-326.*

* cited by examiner

*Primary Examiner*—Thomas C. Lee
*Assistant Examiner*—Suresh K Suryawanshi
(74) *Attorney, Agent, or Firm*—Christopher P. Maiorana PC

(57) ABSTRACT

A prescaler generally comprising a first circuit, a multiplexer, and a second circuit. The first circuit may be configured to present a plurality of control signals in response to a first clock signal having a first frequency. The multiplexer may be configured to multiplex a plurality of data signals in response to the control signals to present a second clock signal having a second frequency that is a non-integer fraction of the first frequency. The second circuit may be configured to present the data signals in response to the second clock signal.

22 Claims, 9 Drawing Sheets

PRESCALER ARCHITECTURE CAPABLE OF NON INTEGER DIVISION

FIELD OF THE INVENTION

The present invention relates to a method and/or architecture for frequency synthesis generally and, more particularly, to a method and/or architecture for frequency scaling by non-integer division.

BACKGROUND OF THE INVENTION

Typical consumer communication products seek to minimize the number of reference frequencies used within to minimize total bill of materials and product construction cost. Common frequency synthesis solutions rely on a dual modulus prescaler capable of dividing a radio frequency clock signal by a configurable divisor, being either N or N+1, where N is an integer. Such a dual modulus prescaler allows many frequencies to be generated while requiring a single crystal oscillator for an input clock having a reference frequency. Conventional dual modulus prescalers demands that the reference frequency be equal to the smallest step between two adjacent frequencies of the synthesized frequencies.

The conventional prescalers are commonly implemented through the application of two distinct classes of circuit, toggle flip-flops and finite state machines. Repeated use of a toggle flip-flop inherently halves the frequency of the input clock signal, providing a division factor of 2. Repeated use allows division by a modulus of the form $2^N$.

Dual modulus action is often provided via a fully synchronous circuit built through the repeated use of D-type flip-flops to form a finite state machine. The finite state machine has states that are configured to follow a repeated pattern in response to the input clock. The repeated pattern creates a lower output frequency than the reference frequency of the input clock.

A modulus control signal is commonly used to select one of several repeated patterns permitting the input clock to be divided by one of two or more moduli. Therefore, the finite state machine approach provides multiple modulus prescalers capable of dividing by multiple moduli which differ by an integer (usually unity). Coupling the two distinct classes of circuits allows higher value moduli to be realized. When applied within a frequency synthesizer, the multiple modulus prescalers generate a synthesized clock with a frequency that is an integer fraction of the reference frequency.

Implementation of a dual modulus prescaler capable of division by either N or N+0.5 allows the frequency reference to be twice the smallest frequency step within the system. Division by N+0.5 provides well known and documented performance benefits to the consumer product. Division by either N or N-0.5 provides equivalent operational and performance benefits.

Implementation of a dual modulus prescaler capable of division by the factor N+0.5 demands a circuit capable of dividing an input clock signal by a multiple of 0.5. Furthermore, such a circuit must be capable of operation at RF frequencies for the dual modulus prescaler to be of practical use in a communications application. Generation of dual moduli differing by a factor of 0.5 also precludes the use of completely synchronous logic techniques based exclusively around either the rising or falling edges of a synchronization signal for circuit development.

A first conventional approach uses two identical division circuits, each clocked from opposite edges of the input clock (i.e., one from the rising edge, one from the falling edge) to divide the input clock by a predetermined factor. The two division circuits present two output signals that are identical to each other but time shifted with respect to each other. One of the two output signals is selected as an output waveform during any given period. Choice of an appropriate time to switch the selection between the output signals allows the output waveform to be time shifted, providing division by a factor of the form N+0.5, where N is an integer.

Several factors limit the applicability of the first conventional approach. Since two instances of the same division circuit are used (each capable of dividing by a factor N, where N is an integer, and each clocked from opposite phases of the input clock), the total die area and power consumption is roughly double that of a division circuit capable of dividing only by a factor N. Some commonality usually exists between the two instances of the division circuit hence minor area and/or power optimization is possible.

Another limitation of the first conventional approach is that memory elements, usually flip-flops, in the two division circuits are in some unknown state upon application of power. The two instances of the division circuit should operate in a locked fashion but will not necessarily be locked in the appropriate way when power is initially applied. Some mechanism for resetting the memory elements is required. For logic capable of operation at a maximum speed permissible by a given geometry manufacturing process, incorporation of any reset mechanism degrades operation by a significant margin. To provide operation of a memory element with some reset mechanism that is equivalent to that of a memory element without reset demands increased die area (corresponding to product cost) and increased power (impacting both product cost, product characteristics, die packaging and other circuits on the IC).

A second conventional approach controls an inversion of the input clock prior to a division circuit allowing the phase of the input clock to be advanced or retarded. Selection of times when the inversion of the input clock takes place provides division by a factor of the form N+0.5, where N is an integer.

Several factors also limit the applicability of the second conventional approach. Controlled inversion of a local oscillator signal, such as an output of a voltage controlled oscillator and/or a current controlled oscillator, can be performed in several ways. Inversion circuit examples may include exclusive-OR gates or a multiplexor. However, the decision when to invert the input clock takes place synchronous to the input clock. Consequently, there must always be a latency between the circuit determining when to invert the input clock and the circuit implementing the inversion itself. The latency manifests itself as a glitch on the resultant signal. It is well documented that signal glitches taking place on the input clock or a synchronization signal can cause operational failure and reliability issues.

SUMMARY OF THE INVENTION

The present invention concerns a prescaler generally comprising a first circuit, a multiplexer, and a second circuit. The first circuit may be configured to present a plurality of control signals in response to a first clock signal having a first frequency. The multiplexer may be configured to multiplex a plurality of data signals in response to the control signals to present a second clock signal having a second frequency that is a non-integer fraction of the first frequency.

The second circuit may be configured to present the data signals in response to the second clock signal.

The objects, features and advantages of the present invention include providing a prescaler architecture that may provide for (i) single modulus prescaling capable of division by a non-integer modulus, (ii) single modulus prescaling capable of division by an integer modulus, (iii) dual modulus prescaling where the two moduli are separated by a non-integer value, (iv) dual modulus prescaling where the two moduli are separated by an integer value, (v) elimination of glitches in the synthesized clock signal, (vi) lower power consumption, (vii) increased upper operating frequency, (viii) consistency in electrical characteristics when configured for multiple moduli, (ix) minimal loading of the input clock source, and/or (x) quadrature signal generation.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
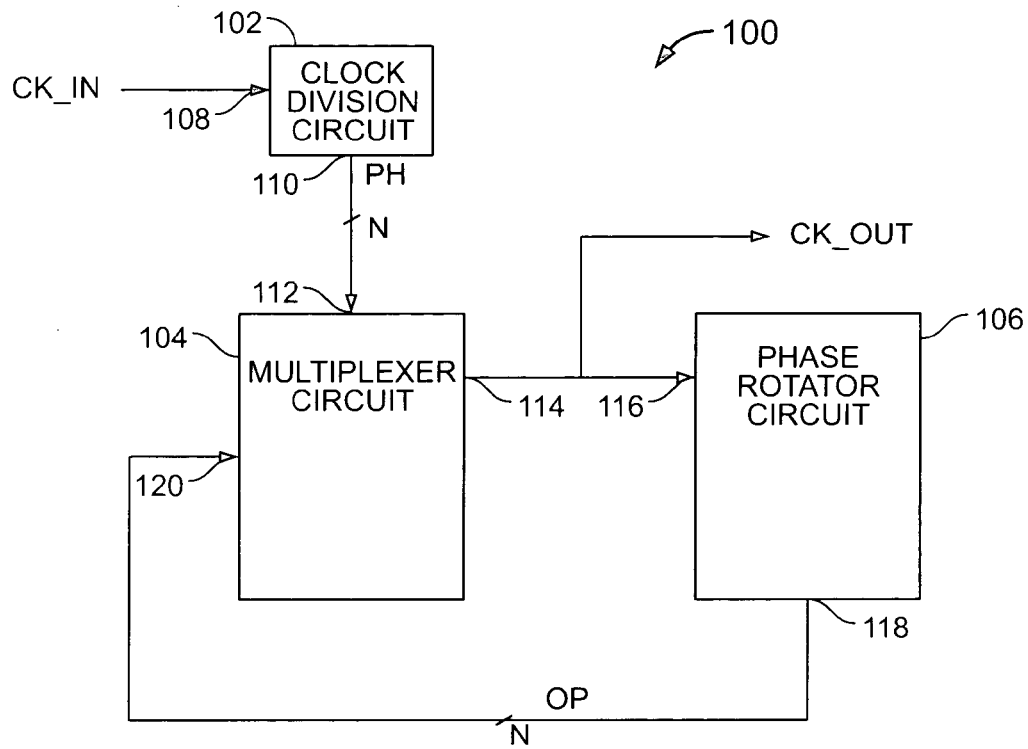
FIG. 1 is a block diagram of an example prescaler implementing the present invention.

Referring to FIG. 1, a block diagram of a prescaler 100 is shown in accordance with a preferred embodiment of the present invention. The prescaler 100 may have many applications in communications products and may also be of general use in radio frequency integrated circuit (RFIC), application specific integrated circuits (ASIC) and application specific standard products (ASSP) requiring clock generation circuits. The prescaler 100 generally comprises a circuit 102, a circuit 104, and a circuit 106.

The circuit 102 may have an input 108 to receive a signal (e.g., CK_IN). The circuit 102 may have an output 110 to present a signal (e.g., PH) to an input 112 of the circuit 104. The circuit 104 may have an output 114 to present a signal (e.g., CK_OUT) to an input 116 of the circuit 106. The circuit 106 may have an output 118 to present a signal (e.g., OP) to an input 120 of the circuit 104.

The signal CK_IN may be implemented as an input clock signal or a reference clock signal. The signal CK_IN may have an input frequency. The signal CK_IN is generally a square wave with a fifty percent duty cycle. Other waveforms and duty cycles may be implemented in the signal CK_IN to meet the design criteria of a particular application.

The signal PH may be implemented as a multiple-phase clock signal having a frequency and multiple phases. The signal PH may comprise several signals (e.g., PH1 to PHN). In one embodiment, the signals PH1 to PHN may be non-overlapping signals. In another embodiment, the signals PH1 to PHN may include two or more overlapping signals. Other variations of the signal PH may be implemented to meet the design criterial of a particular application.

The signal CK_OUT may be implemented as an output clock signal. The signal CK_OUT may have a output frequency, an output duty cycle, and an output phase relative to the signal CK_IN. In one embodiment, the output frequency may be set as a predetermined fraction of the input frequency. In other embodiments, the output frequency may be selectable from among several predetermined fractions of the input frequency. Each predetermined fraction may be an integer or a non-integer value. Where two or more predetermined fractions may be selected from, the predetermined fractions may vary from each other by an integer or a non-integer value.

The signal OP may be implemented as a data signal. The signal OP may comprise many signals (e.g., OP1 to OPN). Each of the signals OP1 to OPN may convey a bit of data (e.g., a logical high state or a logical low state). Some, but generally not all of the signals OP1 to OPN may be in the logical high state simultaneously. Some, but generally not all of the signals OP1 to OPN may be in the logical low state simultaneously.

The circuit 102 may be implemented as a clock divide circuit. The clock divide circuit 102 may present the signal PH as a function of the signal CK_IN. The frequency of the signal PH may be an integer fraction of the input frequency of the signal CK_IN.

The circuit 104 may be implemented as a multiplexer circuit. The multiplexer circuit 104 may receive each portion of the signal PH as a control signal. The multiplexer circuit 104 may use the signal PH to select one bit of the signal OP to present as the signal CK_OUT.

The circuit 106 may be implemented as a phase rotator circuit. The phase rotator circuit 106 may present the signal OP as selected from (i) a function of the signal CK_OUT and (ii) one or more predetermined patterns. While the signal OP is a function of the signal CK_OUT, the phase rotator circuit 106 may sequence the signal OP through multiple patterns. Each adjacent pattern of the sequence may shift each bit of the pattern to an adjacent position. The bit shifted out of a last bit position at one end of the pattern may be wrapped around to a first bit position at the other end of the pattern.

In an example embodiment, the prescaler 100 may implement a single modulus divide operation. The modulus may be 2.5. In the example embodiment, the signal PH may be implemented as four control signals PH1 to PH4. The signal OP may also be implemented as four data signals OP1 to OP4.

Figure 2:
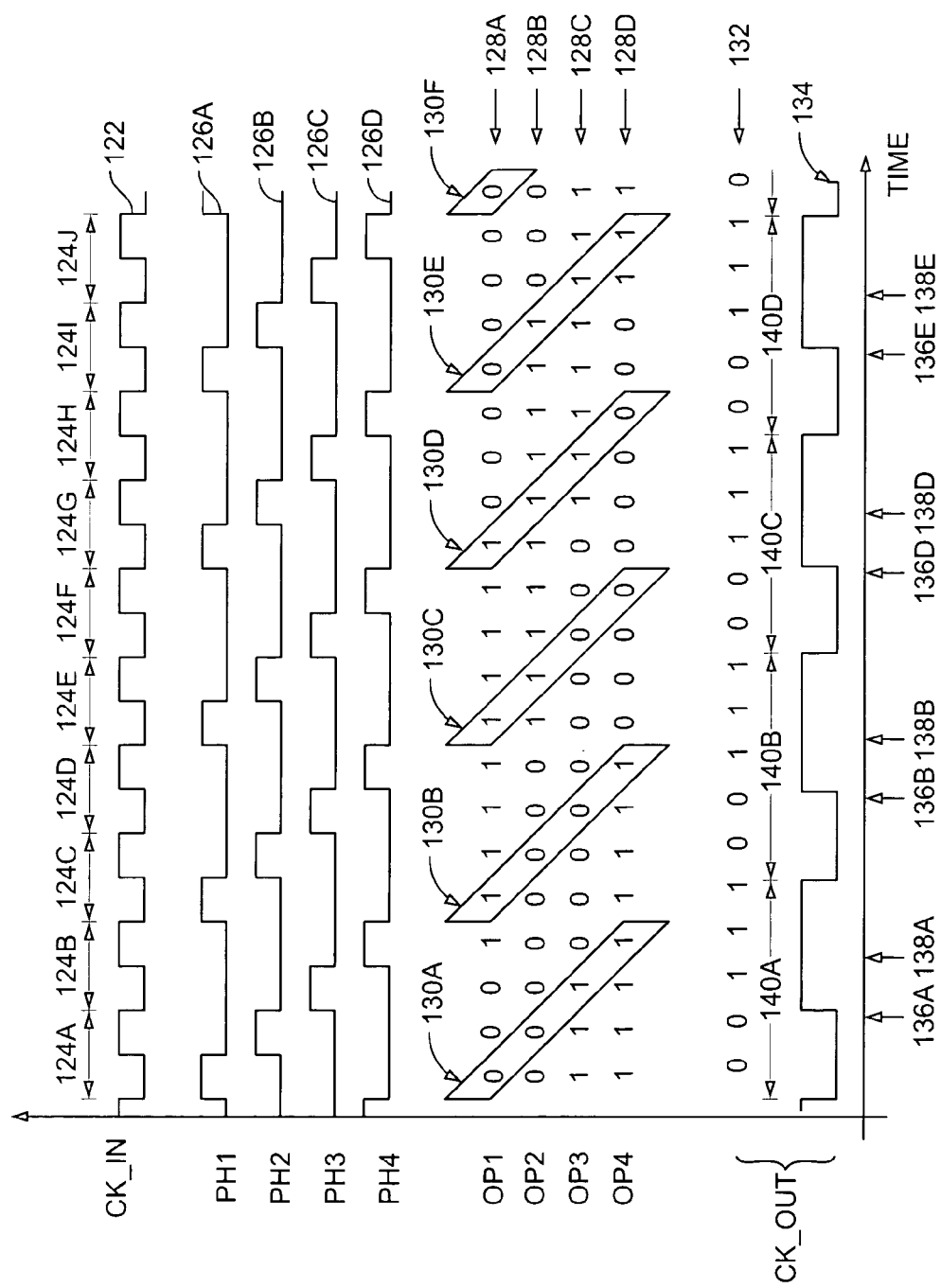
FIG. 2 is a timing diagram of the signals shown in FIG. 1.

Referring to FIG. 2, a timing diagram of the signals shown in FIG. 1 implementing the example embodiment is provided. The signal CK_IN may be represented by a waveform 122. Several cycles of the signal CK_IN may be identified by periods 124A to 124J. The input frequency may be an inverse of a period 124. The input duty cycle may be 50 percent.

The clock division circuit 102 may divide the signal CK_IN into four signals PH1 to PH4 as indicated by waveforms 126A–D respectively. Each signal PH1 to PH4 may have a frequency that is one-half of the input frequency. Each of the signals PH1 to PH4 may have a duty cycle of 25 percent. The signals PH1 to PH4 may be non-overlapping with signal PH2 trailing the signal PH1 by 90 degrees, the signal PH3 trailing the signal PH2 by 90 degrees, and the signal PH4 trailing the signal PH3 by 90 degrees. As a result, the signals PH1 to PH4 generally causes two continuous periods 124 of time for the signal CK_IN to be quantized into four equal sections. Each section may be an equal "slice" of time.

The non-overlapping signals PH1 to PH4 may be used as a one-hot control signal to control the multiplexer circuit 104. A one-hot control signal may be a digital control vector where a bit may be in an asserted state at a given time. The remaining bits may be in a de-asserted state. For the signal PH, a phase PHX (where X is an integer and $1 \leq X \leq 4$) may be in a logical high state at any given time while the remaining phases PHY (where Y is an integer, $1 \leq Y \leq 4$, and $Y \neq X$) may be in a logical low state.

The multiplexer circuit 104 may implement a 4:1 multiplex operation. In particular, the multiplexer circuit 104 may select among the signals OP1, OP2, OP3, and OP4 to present as the signal CK_OUT while a respective signal PH1, PH2, PH3, or PH4 is in the logical high state. The signals OP1 to OP4 may be represented as strings 128A–D of logical ones and logical zeros respectively.

The phase shift circuit 106 may present the signal OP with an initial pattern of "0011" at the start of the period 124A. The phase shift circuit 106 may shift the pattern "0011" right with wrap around to the left at each transition of the signal CK_OUT from the logical zero state to the logical one state. In other words, the sequence of patterns for the signal OP may be "0011", "1001", "1100", and then "0110". The sequence of patterns may be repeated as necessary continuing with the pattern "0011".

The multiplexer circuit 104 may select a signal from among the signals OP1 to OP4 as identified by parallelograms 130A–F. Each logical one and logical zero in the parallelograms 130A–F may indicate a state of the signal CK_OUT, as represented by the string 132 of logical ones and logical zeros. The string 132 may be expressed graphically as a waveform 134 that may represent the signal CK_OUT.

The signal CK_OUT may undergo a logical zero state to a logical one state transition at a time 136A. The transition at the time 136A may cause the phase rotator circuit 106 to shift the signal OP from the pattern "0011" to the next pattern "1001". The next pattern "1001" may be available to the multiplexer circuit 104 after a time 138A. In a similar fashion, the signal CK_OUT may undergo a logical zero state to a logical one state transition at subsequent times 136B–E. The transitions may cause the phase rotator circuit 106 to transition to subsequent patterns. The subsequent patterns may be available to the multiplexer circuit 104 after times 138B–E respectively. The phase rotator circuit 106 may be designed to detect logical one to logical zero transitions in the signal CK_OUT and/or rotate the signal OP through the patterns in the other direction.

The resulting signal CK_OUT may have periods identified as 140A–D. Each of the periods 140 may have a duration equal to 2.5 times the duration of the period 124. As a result, the output frequency of the signal CK_OUT may be the input frequency of the signal CK_IN divided by 2.5. The example embodiment of the prescaler 100 therefore may have a non-integer modulus of division.

Since the four phase signal PH generated by the clock division circuit 102 could optionally not be used to directly drive any further loads, a change in capacitance over time as the prescaler 100 switches, as observed at the clock input 108, may be reduced. Within a frequency synthesizer, the reduced loading may aid to lower unwanted feedback from the prescaler 100 into a voltage controlled oscillator (VCO) (not shown) and/or a current controlled oscillator (CCO) (not shown). The feedback would normally cause undesired modulation of an output clock of the VCO/CCO. In the context of a communications receiver, such feedback generally causes frequency conversion error in the signal path.

Figure 3:
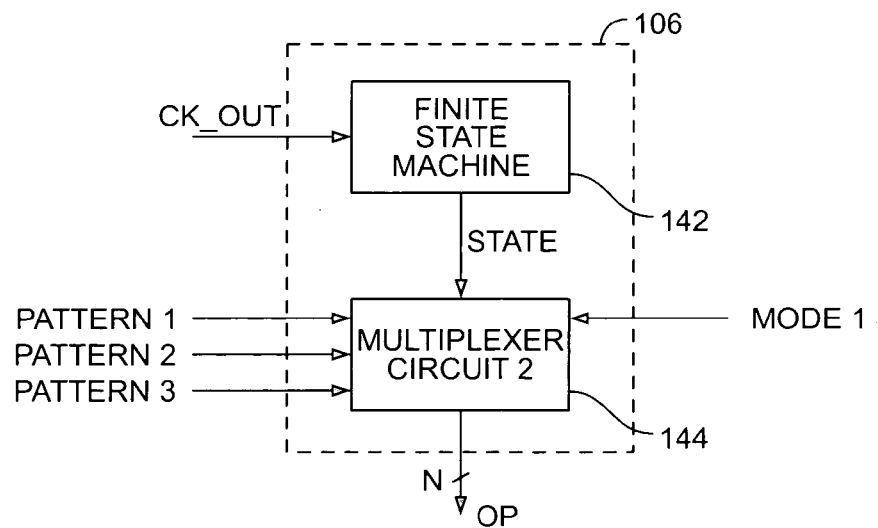
FIG. 3 is a detailed block diagram of a phase rotator.

Referring to FIG. 3, a detailed block diagram of the phase rotator circuit 106 is shown. The phase rotator circuit 106 may comprise a circuit 142 and a circuit 144. The circuit 142 may receive the signal CK_OUT. The circuit 144 may present the signal OP. A signal (e.g., STATE) may be presented by the circuit 142 to the circuit 144. A signal (e.g., MODE1) may be received by the circuit 144. One or more signals (e.g., PATTERN1, PATTERN2 and PATTERN3) may also be received by the circuit 144.

The signal STATE may be implemented as a multiple bit state identifier or state number. For example, the signal STATE may be a four bit number. Generally, the number of bits in the signal STATE may match the number of phases of the signal PH. Other widths of the signal STATE may be implemented to meet the design criteria of a particular application.

The signal MODE1 may be implemented as a mode select signal. The signal MODE1 may be a multiple bit signal used to control the presentation of the signal OP by the circuit 144. The signal MODE1 may be used to select from among the signals STATE, PATTERN1, PATTERN2, and PATTERN3 for presentation of the signal OP.

The signals PATTERN1, PATTERN2, and PATTERN3 may be implemented as predetermined binary patterns or digital codes. Each of the signals PATTERN1–3 may have a multiple bit width that may match the width of the signal OP. Additional numbers of patterns may be provided to the circuit 144 to meet the design criteria of a particular application.

The circuit 142 may be implemented as a finite state machine circuit. The finite state machine circuit 142 generally changes the presentation of the signal STATE upon each transition of the signal CK_OUT from the logical zero state to the logical one state. In one embodiment, the finite state machine circuit 142 may change the presentation of the signal STATE upon each transition of the signal CK_OUT from the logical one state to the logical zero state. Other variations of the finite state machine circuit 142 may be implemented to meet the design criteria of a particular application.

The circuit 144 may be implemented as a second multiplexer circuit. The second multiplexer circuit 144 may receive the signal MODE1 as the selection signal. The second multiplexer circuit 144 may present the signal OP as selected from among the signals STATE, PATTERN1, PATTERN2, and PATTERN3.

Each of the signals PATTERN1–3 may be used to control the waveform of the signal CK_OUT. Each signal PATTERN1–3 may impact the frequency, phase, and/or duty cycle of the signal CK_OUT. The signals PATTERN1–3 may also be used to provide a multiple modulus capability for the prescaler 100.

Careful selection of the data signal OP applied to the multiplexer circuit 102 may allow various waveforms with controlled characteristics to be synthesized. If two of the four bits of the signal OP are continuously asserted and correspond to sequentially selected outputs when the finite state machine circuit 142 cycles while the other two bits are de-asserted, the resultant signal CK_OUT from the multiplexer circuit 102 may correspond to the signal CK_IN divided by a factor of 2 with the duty cycle being 50 percent. If two of the four bits of the signal OP are continuously asserted but do not correspond to sequentially selected outputs when the finite state machine circuit 142 cycles, then the resultant signal CK_OUT may exhibit a division factor of 1 with a duty cycle reflecting that of the signal CK_IN. If two of the four bits of the signal OP are asserted and correspond to sequentially selected outputs when the finite state machine circuit 142 cycles while the other two bits are de-asserted and the position of the two asserted bits is shifted by one bit for each cycle, then the resultant signal CK_OUT from the multiplexer circuit 102 may correspond to the input frequency divided by a factor of 2.5.

By switching the data signal OP received by the multiplexer circuit 102 a division of 2.5, 2 or 1 may be achieved. The prescaler 100 may thus provide several divisions that may be switched in or out of a signal path with minimal affect on surrounding circuits. Other interesting options of the signal CK_OUT may be uncovered when the signal OP presented to the multiplexer circuit 102 is time varied (synchronously) in some fashion to the signal CK_IN and/or additional states are provided by the finite state machine circuit 142.

Figure 4:
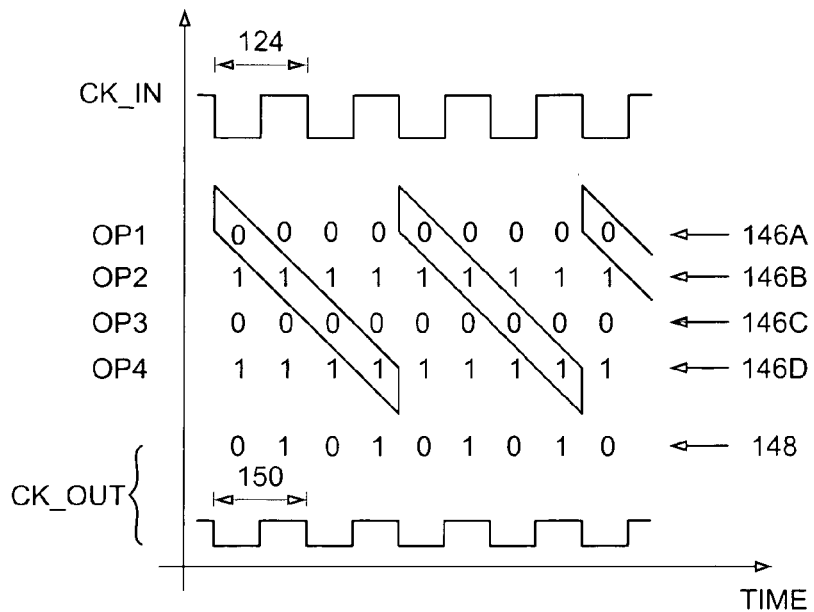
FIG. 4 is a timing diagram of a divide by one operation.

Referring to FIG. 4, a timing diagram of an example of a divide by one operation is shown. The signal MODE1 may be used to select the signal PATTERN1 for presentation as the signal OP. The signal PATTERN1, and thus the signal OP, may have a binary pattern of "0101". Therefore, the signals OP1 and OP3 may have a constant value of logical zero while the signals OP2 and OP4 may have a constant value of logical one as indicated by sequences 146A–D. Each period of the signal PH may cause the multiplexer circuit 104 to present a sequence 148 of logical ones and logical zero as the signal CK_OUT. Each period 150 of the signal CK_OUT may equal a period 124 of the signal CK_IN. Therefore, the prescaler 100 may present the signal CK_OUT as the signal CK_IN divided by unity.

Figure 5:
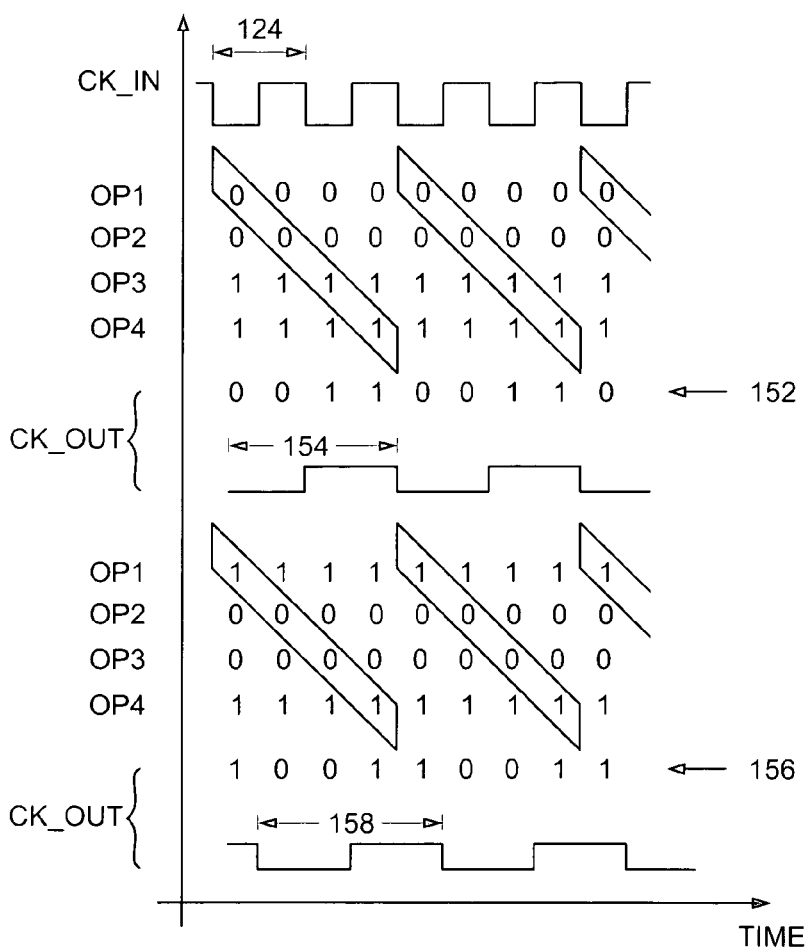
FIG. 5 is a timing diagram of a divide by two operation.

Referring to FIG. 5, a timing diagram of divide by two operations are shown. The second multiplexer 144 may present the signal PATTERN2 as the signal OP with a fixed pattern of "0011". Therefore, the signals OP1 and OP2 may be constant logical zeros while the signals OP3 and OP4 may be constant logical ones. A resulting sequence 152 of logical ones and logical zeros for the signal CK_OUT may have a period 154 that is twice as long as the period 124 of the signal CK_IN.

In another example, the second multiplexer circuit 144 may present the signal OP with a pattern of "1001". The signals OP1 and OP4 may thus be constant logical ones while the signals OP2 and OP3 may be constant logical zeros. A resulting sequence 156 of logical ones and logical zeros for the signal CK_OUT may have a period 158 that is twice as long as the period 124 for the signal CK_IN. Note that the signal CK_OUT resulting from the pattern "0011" may be 90 degrees out of phase from the signal CK_OUT resulting from the patter "1001".

The prescaler 100 may thus implement a quadrature generator by incorporating two multiplexer circuits 104 each receiving a different predetermined pattern. The quadrature generation may be used for the generation of local oscillator clock signals with a precise phase difference of 90 degrees. Quadrature signals are also generally required by mixer circuits for translations of communication signals from one frequency band to another.

Figure 6:
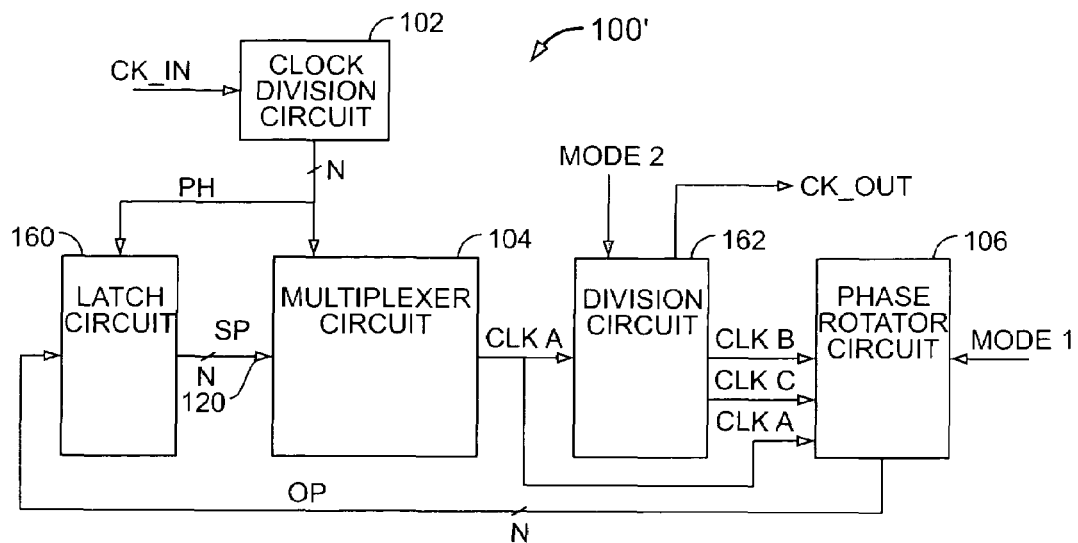
FIG. 6 is a block diagram of a second embodiment.

Referring to FIG. 6, a block diagram a second embodiment of a prescaler 100' implementing the present invention is shown. The prescaler 100' generally comprises the clock division circuit 102, the multiplexer circuit 104, the phase rotator circuit 106, a circuit 160, and a circuit 162. The signal PH may be presented to the multiplexer circuit 104 and the circuit 160. The phase rotator circuit 106 may present the signal OP to the circuit 160 instead of to the multiplexer circuit 104. The circuit 160 may present a signal (e.g., SP) to the multiplexer circuit 104. The multiplexer circuit 104 may present a signal (e.g., CLKA) to the phase rotator circuit 106 instead of the signal CK_OUT. The multiplexer circuit 104 may also present the signal CLKA to the circuit 162. The phase rotator circuit 106 may receive a signal (e.g., CLKB) and a signal (e.g., CLKC) from the circuit 162. The circuit 162 may present the signal CK_OUT. The circuit 162 may receive a signal (e.g., MODE2).

The signal SP may be implemented as a data signal. The signal SP may be a latched version of the signal OP. The signal CLKA may be implemented as a clock signal having a frequency, a duty cycle, and a phase relative to the signal CK_IN. The signal CLKA may be presented by the multiplexer circuit 104 based upon the signal SP and the signal PH. The signal CLKB may be implemented as another clock signal having another frequency, another duty cycle, and another phase relative to the signal CK_IN. The signal CLKC may be implemented as a clock signal having a frequency, a duty cycle, and a phase relative to the signal CK_IN. The signal MODE2 may be implemented as a mode control signal. The signal MODE2 is generally a single bit signal used in a dual modulus implementation to switch between the two different moduli of division.

The circuit 160 may be implemented as a latch circuit. The latch circuit 160 may be configured to prevent changes to the input 120 of the multiplexer circuit 104 while the multiplexer circuit 104 is transitioning between the various input bits. The latch circuit 160 generally has a flip-flop (FIG. 9) to latch each bit of the signal OP. The latch circuit 160 may update the signal SP in response to the signal PH.

The circuit 162 may be implemented as a division circuit. The division circuit 162 may divide the signal CLKA by integer fractions to generate the signal CK_OUT, the signal CLKB and the signal CLKC. The division circuit 162 may change the way that the signals CK_OUT and CLKC are generated in response to the signal MODE2. Therefore, the division circuit 162 may allow the prescaler 100' to have a modulus of division other than 2.5, 2, and 1. For example, the division circuit 162 may divide the signal CLKA by two to generate the signal CK_OUT. As a result, the prescaler 100' may have an overall division of 5 from the signal CK_IN to the signal CK_OUT. In another example, the division circuit 162 may divide the signal CLKA by 6 resulting in an overall division of 15 from the signal CK_IN to the signal CK_OUT. Other implementations of the division circuit 162 may be provided to meet the design criteria of a particular application.

Since the signal PH bears a direct relationship to the state of the finite state machine 142, whose state transitions as a consequence of changes at the signal CLKA, it may be evident that timing differences in the operation of the various logic primitives used to implement the prescaler 100 may cause transient spikes or glitches in the signal CLKA generated by the multiplexer circuit 102. The glitches generally affect system performance corresponding to (i) high frequency noise injected into an integrated circuit substrate and adjacent circuits and (ii) could potentially cause operational failure. The signal PH from such a clock division circuit 102 may be used as a global control or clock input to further circuits (not shown). Glitches with sufficient energy could be interpreted by the further circuits as legal transitions triggering operational failures. The four-phase signal PH generated by the clock division circuit 102 may be used to select from among the data signals SP1–4 to the multiplexer circuit 102. By ensuring that the signals SP1–4 may only transition while not selected then the glitches described previously may not occur.

Since the each phase of the signal PH may have a duty cycle of 25 percent, a sample section of the latch circuit 160 may be modified to accept two phases of the signal PH. Two of the four phases of the signal PH may be used to sample the signal OP with a single phase used for a hold section of the latch circuit 160. A net effect of modifying to accept two phases is generally to allow the latch circuit 160 to operate at approximately half the power of a conventional implementation. The latch circuit 160 may contribute a major proportion of a total circuit power consumption.

Figure 7:
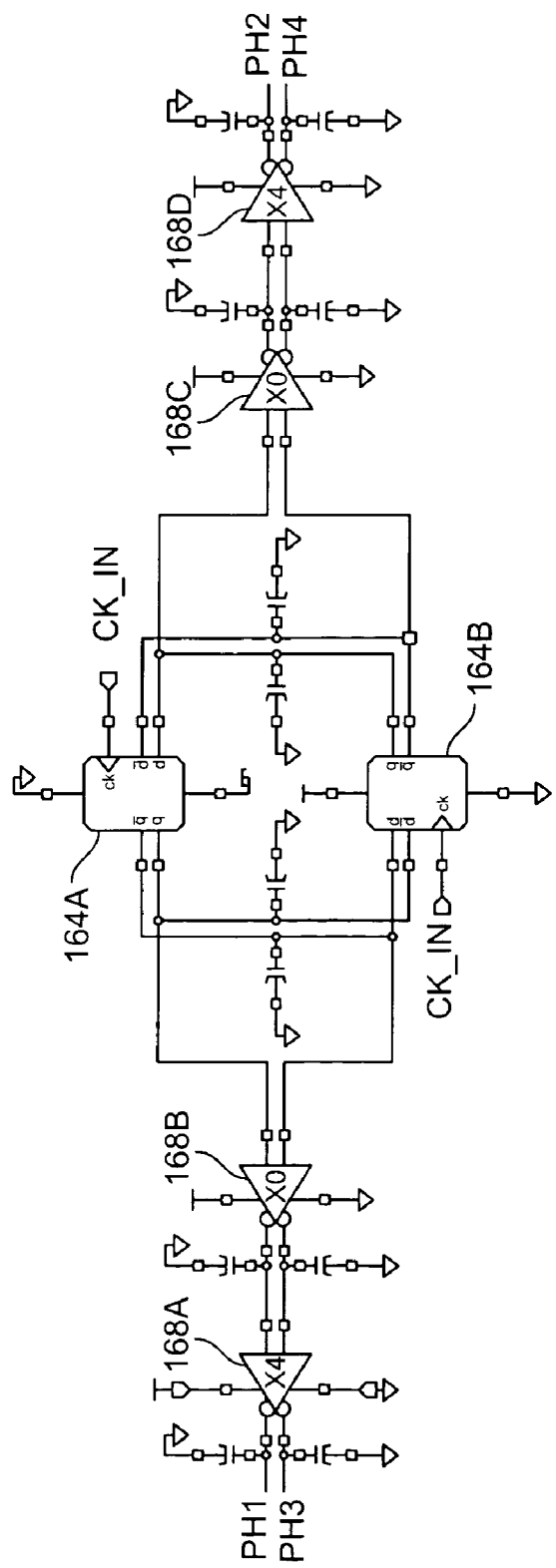
FIG. 7 is a schematic of a clock division circuit of the second embodiment.

Referring to FIG. 7, a schematic of an example clock division circuit 102 is shown. The clock division circuit 102 generally comprises multiple half latches 164A–B and multiple differential buffers 168A–D. Each of the half latches 164A–B may have a clock input to receive the signal CK_IN. Each latch 164A–B may have a differential input (e.g., D and /D). Each latch 164A–B may have a differential output (e.g., Q and /Q). The differential output of the latch 164B may be directly coupled to the differential input of the latch 164A (e.g., Q to D and /Q to /D). The differential output of the latch 164A may be inverse coupled to the differential input of the latch 164B (e.g., Q to /D and /Q to D). The differential output of the latch 164A may be buffered by the buffers 168A–B to present the signals PH1 and PH3. The differential output of the latch 164B may be buffered by the buffers 168C–D to present the signals PH2 and PH4.

While the clock divide circuit 102 is generally used to divide by a fixed modulus of 2, an operation of a fully differential latch implementation inherently synthesizes the four clock phases of the signal PH from the applied signal CK_IN. Conventionally two of the phases of the signal PH may be thought of as the output clock while the remaining two phases may be considered feedback and retained within the clock division circuit 102. The half latches 164A–B used to implement the clock division circuit 102 may be repeated to provide isolation at the clock input 108 of the prescaler 100 thus reducing modulation of upstream circuits in a target application. Therefore, an input impedance of the prescaler 100 may exhibit less variation than other alternative approaches. The upstream circuits may typically include the voltage controlled oscillators and/or the current controlled oscillators.

Figure 8:
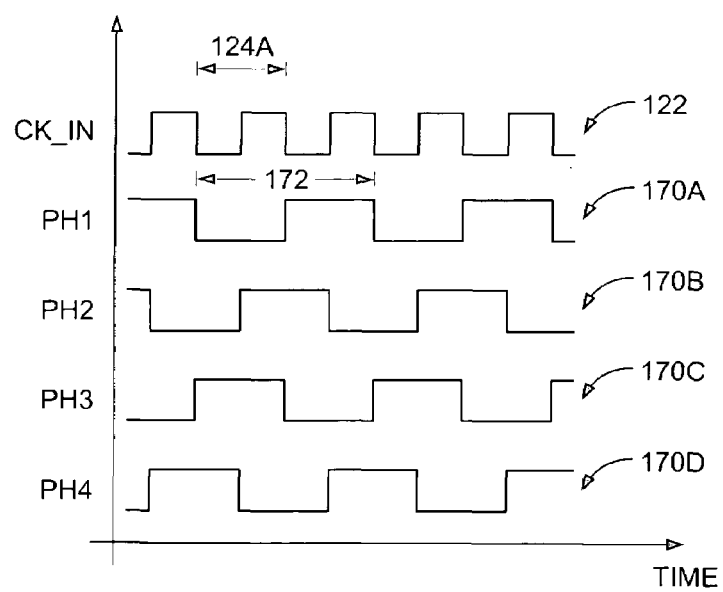
FIG. 8 is a timing diagram of the signals generated by the clock division circuit.

Referring to FIG. 8, a timing diagram of the signal PH is shown. The signal CK_IN may be represented by the waveform 122 with the period 124. The signals PH4 may be represented by the waveforms 170A–D each with a period 172. The signal PH3 may be 180 degrees out of phase with respect to the signal PH1. The signal PH4 may be 180 degrees out of phase with respect to the signal PH2. The signal PH2 may be 90 degrees out of phase with respect to the signal PH1. Therefore, the signals PH1 through PH4 may overlap each other. The overlapping signals may require a multiplexer capable of resolving the phase overlap of the control signal PH. An example implementation of such a multiplexer is illustrated in FIG. 9.

Figure 9:
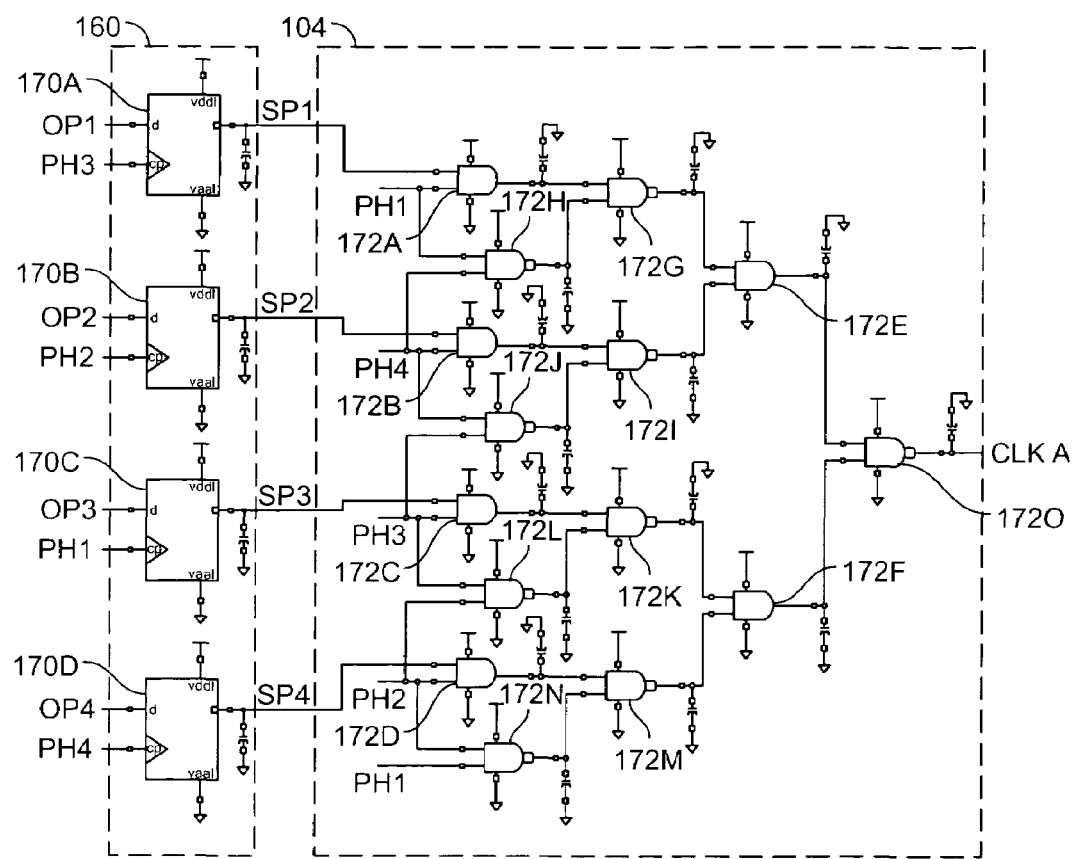
FIG. 9 is a schematic of a phase latch circuit and a multiplexer circuit.

Referring to FIG. 9, a schematic of the latch circuit 160 and the multiplexer circuit 104 is shown. The latch circuit 160 generally comprises multiple latches 170A–D. Each latch 170A–D may be implemented as a D-type flip-flop. The latch circuit 160 may include a flip-flop 170 for each bit of the signal OP. Each flip-flop 170A–D may have a data input (e.g., D) for receiving a bit of the signal OP and a data output (e.g., Q) for presenting a bit of the signal SP. Each flip-flop 170A–D may have a clock input for receiving a phase of the signal PH.

The multiplexer circuit 104 generally comprises a plurality of logic gates 172A–O. The logic gates 172A–N may be implemented as a mixture of logical AND gates and logical NAND gates. Other boolean functions, such as NOR, may be used to implement the multiplexer circuit 104. The logic gates 172A–O may be configured to select (i) the signal SP1 while the signals PH1 and PH2 are in the logical one state, (ii) the signal SP2 while the signals PH1 and PH4 are in the logical one state, (iii) the signal SP3 while the signals PH3 and PH4 are in the logical one state, and (iv) the signal SP4 while the signals PH2 and PH3 are in the logical one state.

The individual phases of the signal PH may be presented to the various flip-flops 170A–D such that the selected signal from among the signals SP1–4 may not transition while selected. For example, the signal SP1 may be selected in the multiplexer circuit 104 while the signals PH1 and PH2 are in the logical one state. The signal OP1, however, may be latched and the signal SP1 updated on an edge of the signal PH3 while at least one of the signals PH1 and PH2 are in the logical zero state. Other arrangements among the signals PH, OP, and SP may be implemented to meet the design criteria of a particular application.

Figure 10:
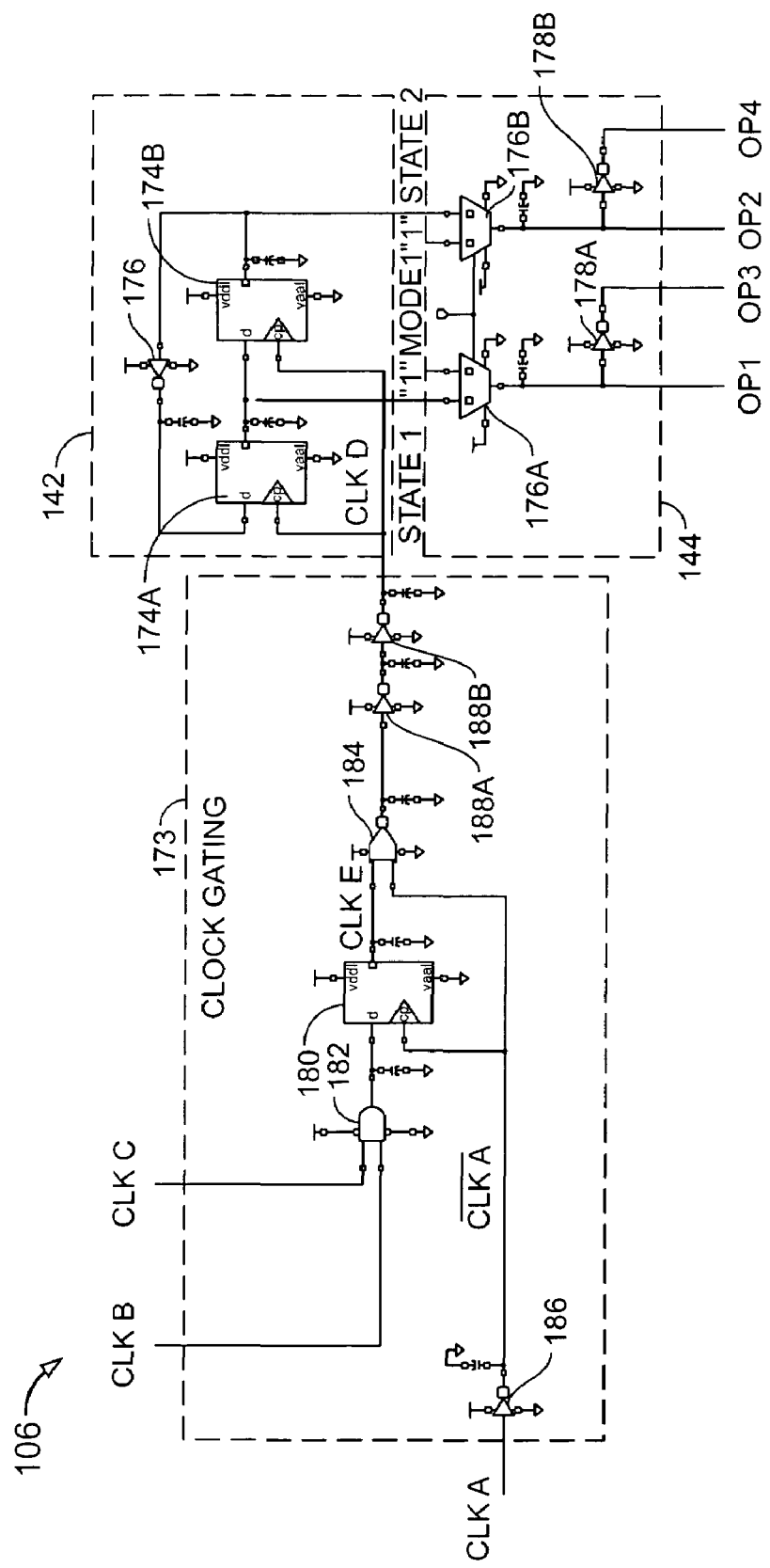
FIG. 10 is a schematic of a phase rotator circuit.

Referring to FIG. 10, a schematic of the phase rotator circuit 106 is shown. As mentioned earlier, the phase rotator circuit 106 generally comprises the finite state machine circuit 142 and the second multiplexer circuit 144. The phase rotator circuit 106 may also include a circuit 173. The circuit 173 may be implemented as a clock gating circuit.

The finite state machine circuit 142 generally comprises several latches 174A–B and an inverter 176. The latches 174A–B may be implemented as D-type flip-flops. Each flip-flop 174A–B may have a data output (e.g., Q) to present a bit of the signal STATE. Each flip-flop 174A–B may be clocked by a signal (e.g., CLKD) received from the circuit 173.

The flip-flops 174A–B and the inverter 176 may be configured to generate a four-state finite state machine. The finite states may follow a sequence of 00, 10, 11, 01, 00. Since all four states of the states are represented, it generally may not matter which initial state the finite state machine circuit 142 enters upon application of power. Correct operation may be ensured subject to a constraint that at most three cycles of the signal CLKB may be required before the finite state machine circuit 142 enters any given state. Therefore, the finite state machine circuit 142 may not require any form of initialization control for correct operation.

The second multiplexer circuit 144 generally comprises multiple multiplexers 176A–B and multiple invertors 178A–B. Each multiplexer 178A–B may receive a bit of the signal STATE and a bit of a predetermined pattern (e.g., 11). Each multiplexer 178A–B may also receive the signal MODE1 to control signal selection. The multiplexer 176A may present the signal OP1. The multiplexer 176B may present the signal OP2.

The invertor 178A may be coupled to an output of the multiplexer 176A to receive the signal OP1. The inverter 178A may invert the signal OP1 to present the signal OP2. The inverter 178B may be coupled to an output of the multiplexer 176B to receive the signal OP2. The inverter 178B may invert the signal OP2 to present the signal OP4. Other implementations of the finite state machine circuit 142 and the second multiplexer circuit 144 may be provided to meet the design criteria of a particular application.

The clock gating circuit 173 may comprise a D-type flip-flop 180, a logic gate 182 (e.g., AND gate), another logic gate 184 (e.g., NOR gate), an inverter 186, and a pair of inverters 188A–B. The logic gate 182 may logically AND the signal CLKB and the signal CLKC. A signal presented by the logic gate 182 may be latched by the flip-flop 180. The flip-flop 180 may present a signal (e.g., CLKE). The flip-flop 180 may be clocked by an inverse of the signal CLKA (e.g., /CLKA). The inverter 186 may invert the signal CLKA prior to the flip-flop 180. The logic gate 184 may logically NOR the signal CLKD and the signal /CLKA to present the signal CLKD. The inverters 188A–B may buffer the signal CLKD prior to presentation to the finite state machine circuit 142.

The clock gating circuit 173 may have two modes of operation determined by the signal CLKC. While the signal CLKC is held in a logical low state, the logic gate 184 may act as a non-inverting buffer. Therefore, the signal /CLKA may be passed through the logic gate 184 and the inverters 188A–B for presentation as the signal CLKD. In another mode of operation, the signal CLKC may be vary in time in response to the signal CLKB. The effect of the signal CLKB and the signal CLKC varying may be to periodically eliminate a low period of the signal CLKA each time the signal CLKC cycles.

Figure 11:
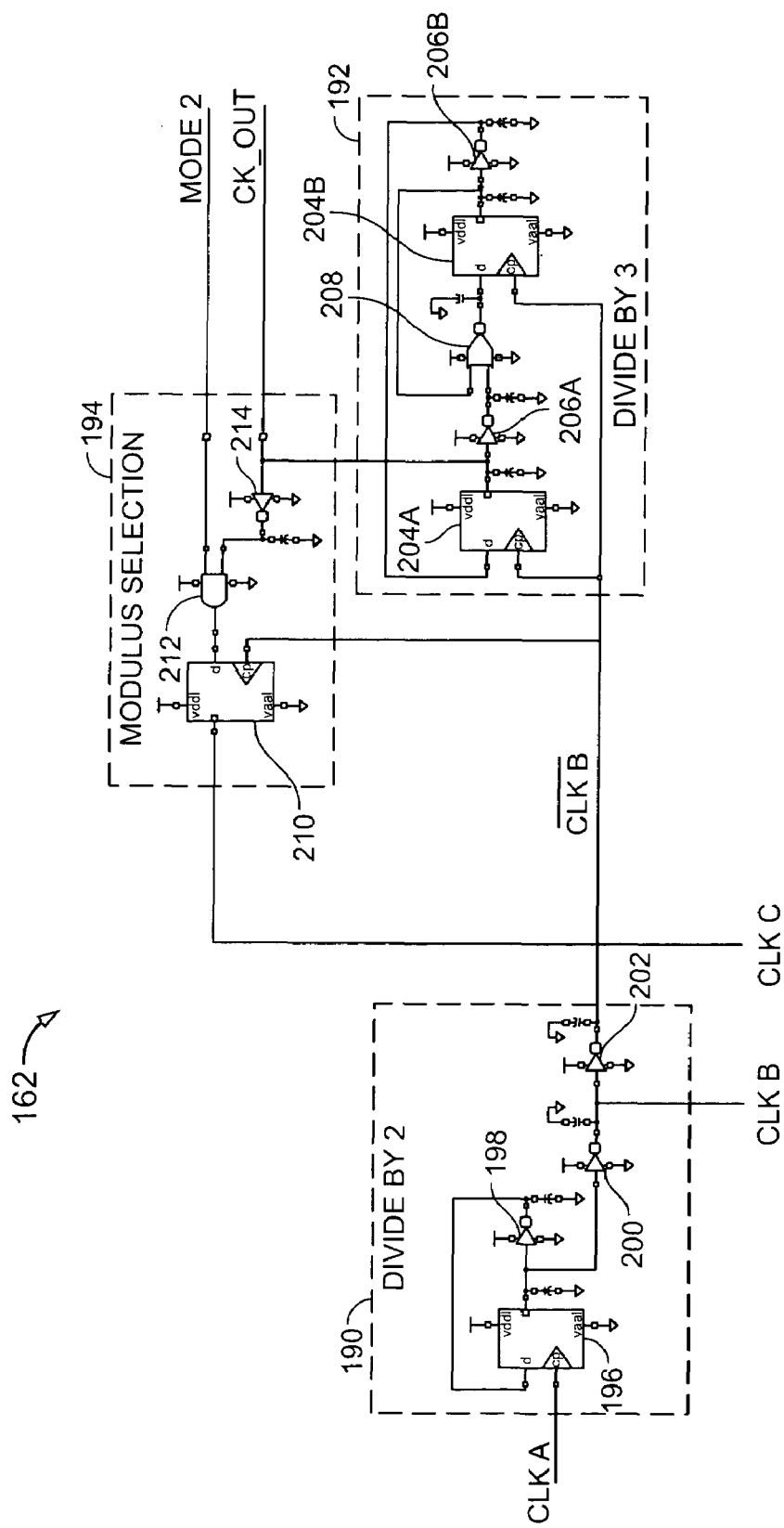
FIG. 11 is a schematic of a division circuit.

Referring to FIG. 11, a schematic of the division circuit 162 is shown. The division circuit 162 generally comprises a circuit 190, a circuit 192, and a circuit 194. The circuit 190 may be implemented as a divide by 2 circuit. The circuit 192 may be implemented as a divide by 3 circuit. The circuit 194 may be implemented as a modulus selection circuit.

The divide by 2 circuit 190 may comprise a D-type flip-flop 196, an inverter 198, an inverter 200, and an inverter 202. The flip-flop 196 and the inverter 198 may be configured to provide a divide by 2 function that divides the signal CLKA to present a signal (e.g., /CLKB). The inverter 200 may invert the signal /CLKB to present the signal CLKB to the clock gating circuit 173. The inverter 202 may invert the signal CLKB to present the signal /CLKB to the divide by 3 circuit 192.

The divide by 3 circuit 192 may comprise multiple D-type flip-flop 204A–B, multiple inverters 206A–B, and a logic gate 208 (e.g., NOR gate). The flip-flops 204A–B, the inverters 206A–B, and the logic gate 208 may be configured to divide the signal /CLKB by 3 to present the signal CK_OUT.

The modulus selection circuit 194 generally comprises a D-type flip-flop 210, a logic gate 212 (e.g., AND gate), and an inverter 214. The inverter 214 may invert the signal CK_OUT. The logic gate 212 may logically AND the inverted signal CK_OUT and the signal MODE2. A signal presented by the logic gate 212 may be latched by the flip-flop 210. The flip-flop 210 may be clocked by the signal /CLKB. The flip-flop 210 may present the signal CLKC to the clock gating circuit 173. While the signal MODE2 is in the logical high state, the signal CLKC may present a pulse every third cycle of the signal /CLKB. The pulse may have a width equal to a cycle of the signal /CLKB. The signal CLKC have a 66% duty cycle of the form 110110110..., where "1" represents the logical high state and "0" represents the logical low state. While the signal MODE2 is in the logical low state, the signal CLKC may also be in the logical low state.

Referring to FIG. 10, the logic gate 182 may shorten the width of the pulses of the signal CLKC to a cycle of the signal CLKA. The flip-flop 180 generally resamples the shortened signal CLKC in response to the signal /CLKA to present the signal CLKE. The logic gate 184 logically ORs the signal CLKE with the signal /CLKA to delete a low period of the signal /CLKA each time that the divide by 3 circuit 192 cycles. As a result, the frequency of the signal CK_OUT may be equal to the frequency of the signal CK_IN divided by 14.5. As stated earlier, while the signal CLKC is in the logical low state, the clock gating circuit 173 may present the signal CLKD as an inverse of the signal CLKA.

The prescaler 100' may provide for a dual modulus operation. A first modulus may be provided by setting (i) the signal MODEL to select the signal STATE from the finite state machine and (ii) the signal MODE2 in the logical high state to hold the signal CLKC in the logical low state. The signal STATE driving the signal OP may cause the prescaler 100' to divide the signal CK_IN by a factor 2.5. The divide by 2 circuit 190 and the divide by 3 circuit 192 may provide additional division operations such that the input frequency of the signal CK_IN is 15 times faster than the output frequency of the signal CK_OUT. The prescaler 100' may provide a second modulus of division while the signal MODE2 is in a logical low state. As a result, the clock gating circuit 173 may use the signal CLKB and the signal CLKC to adjust the frequency of the signal CLKD. The result may be that the input frequency of the signal CK_IN may be 14.5 times faster than that of the output frequency of the signal CK_OUT.

The prescaler 100' may also be able to provide scaling by an integer which is not a direct power of 2 by further dividing by an integer after the initial division by 2.5. For example, the frequency of the signal CK_IN may be divided by 5 by configuring the signal CLKA for division by 2.5 and then dividing the signal CLKA by 2 to generate the signal CK_OUT (e.g., CK_OUT=CK_IN/2.5/2=CK_IN/5). In another example, the frequency of the signal CK_IN may be divided by 10 by dividing the signal CLKA by 2 twice to generate the signal CK_OUT (e.g., CK_OUT=CK_IN/2.5/2/2=CK_IN/10). Other divisions may be implemented to meet the design criteria of a particular application.

Figure 12:
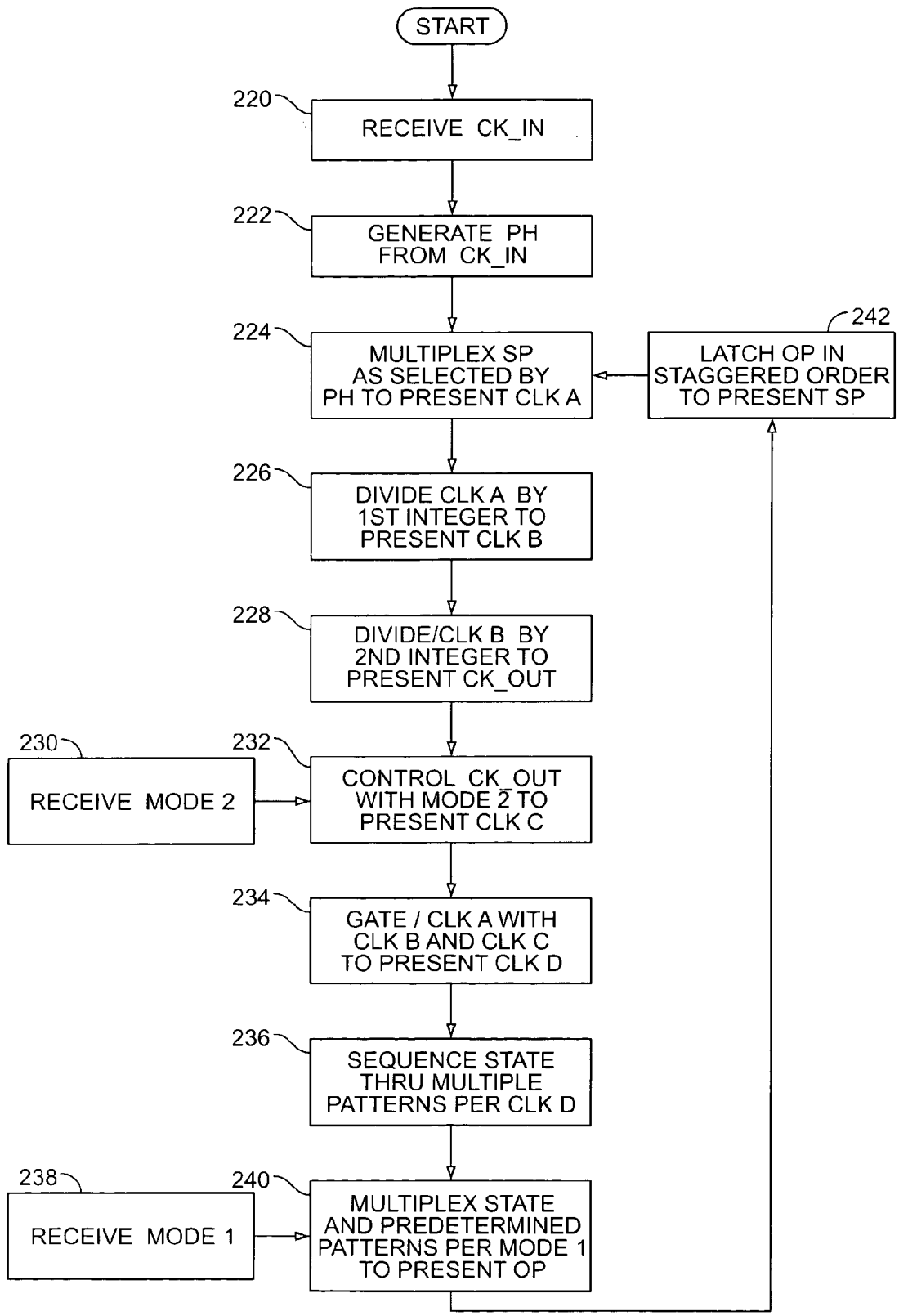
FIG. 12 is a flow diagram of a method of operation.

Referring to FIG. 12, a flow diagram of a process of operating the prescaler 100' is shown. The process may begin with the reception of the signal CK_IN by the clock division circuit 102 (e.g., block 220). The clock division circuit 102 may then present the signal PH (e.g., block 222). The multiplexer circuit 104 may multiplex the signal SP per the signal PH to present the signal CLKA (e.g., block 224). The divide by 2 circuit 190 may divide the signal CLKA to present the signals CLKB and /CLKB (e.g., block 226). The divide by 3 circuit 192 may divide the signal /CLKB to present the signal CK_OUT (e.g., block 228).

Upon reception of the signal MODE2 (e.g., block 230), the modulus control circuit 194 may control the signal CLKC as a function of the signal CK_OUT and the signal MODE2 (e.g., block 232). The clock gating circuit 173 may present the signal CLKD as a function of the signals /CLKA, CLKB, and CLKC (e.g., block 234). The finite state machine circuit 142 may sequence the signal STATE through a plurality of patterns upon detection of each rising edge in the signal CLKD (e.g., block 236).

Upon receipt of the signal MODE1 (e.g., block 238), the second multiplexer 144 may select the signal OP from between the signal STATE and the predetermined patterns (e.g., block 240). The latch circuit 160 may latch the individual bits of the signal OP in a staggered order per the phases of the signal PH to present the signal SP (e.g., block 242). The multiplexer circuit 104 may select from among the bits of the signal SP to present the signal CLKA (e.g., block 224). The process may then continue indefinitely as long as electrical power (e.g., VDD and GND) are applied to the prescaler 100'.

Toggle flip-flops are generally the fastest memory elements which can be constructed in a given production process. Since the prescaler 100 and the prescaler 100' may be implemented through a modified toggle flip-flop circuit, an upper operating frequency may be inherently greater than alternative approaches build around D-type flip-flops. Furthermore, since the memory elements may not require initialization, an upper operating frequency of the prescaler 100 may be inherently higher than alternative approaches that demand memory elements requiring initialization.

The present invention may accommodate implementations that permit memory elements to initially presenting all signals in the same state when power is applied. For example, an implementation may present the signals OP3 and OP4 from differential outputs of the flip-flops 174A–B instead of the inverters 178A–B. It may be possible at power-up that the phase rotator circuit 106 may present all four bits of the signal OP in the logical high state or the logical low state. While all bits of the signal OP are in the same state, the signal CLKA may not present any rising or falling edges back to the flip-flops 174A–B. As a result, a feedback loop from the finite state machine circuit 142, through the second multiplexer circuit 144, through the multiplexer circuit 104, and back to the finite state machine 142 may sit deadlocked at a steady state. The deadlocked feedback loop generally causes the signal CK_OUT to remain at a steady state.

To avoid a steady state condition for the feedback loop, an initialization routine may be established to open and then close the feedback loop in response to a power-up. For example, the signal MODE1 may be selected at power-up to initially multiplex a predetermined pattern having both logical ones and logical zeros to the signal OP. The logical ones and logical zeros in the signal OP may result in edges in the signal CLKA. The edges in the signal CLKA may cause the flip-flops 174A–B to toggle through one or more invalid states and then into a valid state.

Once the flip-flops 174A–B are in a valid state, the signal MODE1 may then be changed to close the feedback loop. The signal MODE1 may be selected to multiplex the complementary signals presented by the flip-flops 174A–B to the signal OP. The signal OP may contain both logical ones and logical zeros since each flip-flop 174A–B may present complementary signals. As a result, the signal CLKA may present rising and falling edges back to the flip-flops 174A–B to maintain sequencing through the valid states. The initialization routines may allow implementations of the present invention using flip-flops lacking an explicit reset capability. In general, the non-resettable flip-flops operate faster than resettable flip-flops for a given power level and/or consume less power for an identical operating speed.

The principle of operation for the present invention may be independent of the electronic materials used for manufacture. Implementation may be performed in a variety of production processes capable of providing primitives capable of switching operation. A specific example of a suitable process may be an 0.18 micron CMOS production process.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation. Additionally, inverters may be added to change a particular polarity of the signals.

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

What is claimed is:

1. A prescaler comprising:
    a first circuit configured to generate a plurality of control signals in response to a first clock signal having a first frequency;
    a multiplexer configured to multiplex a plurality of data signals in response to said control signals to present a second clock signal having a second frequency that is a non-integer fraction of said first frequency;
    a second circuit configured to (i) generate said data signals in response to said second clock signal and (ii) present said data signals directly to said multiplexer;
    a first dividing circuit configured to divide said second clock signal by a first predetermined integer to present a third clock signal; and
    a second dividing circuit configured to divide said third clock signal by a second predetermined integer to present a fourth clock signal.

2. The prescaler according to claim 1, wherein said second circuit is further configured to sequence said data signals through a plurality of patterns response to said second clock signal.

3. The prescaler according to claim 1, wherein said second circuit is further configured to present said data signals in a predetermined pattern such that said second frequency is an integer fraction of said first frequency.

4. The prescaler according to claim 1, wherein said second circuit is further configured to present said data signals in a predetermined pattern such that said second frequency equals said first frequency.

5. The prescaler according to claim 1, further comprising a plurality of latches configured to latch said data signals presented by said second circuit, wherein said second circuit presents said data signals directly to said latches instead of said multiplexer.

6. The prescaler according to claim 5, wherein said latches are further configured to sample said data signals in a staggered order in response to said control signals.

7. The prescaler according to claim 1, wherein said first circuit is further configured to present one of said control signals in an active state at a time.

8. The prescaler according to claim 1, wherein said first circuit is further configured to present at least two of said control signals in an active state at a time.

9. The prescaler according to claim 1, further comprising a selection circuit configured to control said fourth clock signal.

10. A method of dividing a first clock signal having a first frequency, the method comprising the steps of:
    (A) generating a plurality of control signals in response to said first clock signal;

(B) multiplexing a plurality of data signals in response to said control signals to present a second clock signal having a second frequency that is a non-integer fraction of said first frequency;

(C) generating said data signals in response to said second clock signal;

(D) presenting said data signals directly to said multiplexing;

(E) dividing said second clock signal by a first predetermined integer to present a third clock signal: and (F) dividing said third clock signal by a second predetermined integer to present a fourth clock signal.

11. The method according to claim 10, further comprising the step of sequencing said data signals through a plurality of patterns response to said second clock signal.

12. The method according to claim 10, further comprising the step of presenting said data signals to said multiplexing in a predetermined pattern such that said second frequency is an integer fraction of said first frequency.

13. The method according to claim 10, further comprising the step of presenting said data signals to said multiplexing in a predetermined pattern such that said second frequency equals said first frequency.

14. The method according to claim 10, further comprising the step of latching said data signals in response to generating said data signals, wherein step (D) presents said data signals directly, to said latching instead of said multiplexing.

15. The method according to claim 14, wherein the step of latching further comprises the sub-step of sampling said data signals in a staggered order in response to said control signals prior to multiplexing.

16. The method according to claim 10, wherein the step of generating said plurality of control signals comprises the sub-step of presenting one of said control signals in an active state at a time.

17. The method according to claim 10, wherein the step of generating said plurality of control signals comprises the sub-step of presenting at least two of said control signals in an active state at a time.

18. The method according to claim 10, further comprising the step of:
gating said second clock signal in response to said third clock signal and said fourth clock signal prior to generating said data signals.

19. A prescaler comprising:
means for generating a plurality of control signals in response to a first clock signal having a first frequency;
means for multiplexing a plurality of data signals in response to said control signals to present a second clock signal having a second frequency that is a non-integer fraction of said first frequency;
means for generating said data signals in response to said second clock signal;
means for dividing said second clock signal by a first predetermined integer to present a third clock signal; and
means for dividing said third clock signal by a second predetermined integer to present a fourth clock signal.

20. A prescaler comprising:
a first circuit configured to generate a plurality of control signals in response to a first clock signal having a first frequency;
a multiplexer configured to multiplex a plurality of data signals in response to said control signals to present a second clock signal having a second frequency that is a non-integer fraction of said first frequency;
a second circuit configured to generate said data signals in response to said second clock signal;
a first dividing circuit configured to divide said second clock signal by a first predetermined integer to present a third clock signal;
a second dividing circuit configured to divide said third clock signal by a second predetermined integer to present a fourth clock signal;
a gating circuit configured to gate said second clock signal received by said second circuit in response to said third clock signal and said fourth clock signal; and
a selection circuit configured to control said fourth clock signal to select a modulus of division of said first clock signal.

21. The prescaler according to claim 1, further comprising:
a gating circuit configured to gate said second clock signal received by said second circuit in response to said third clock signal and said fourth clock signal.

22. The method according to claim 10, further comprising the step of:
controlling said fourth clock signal to select a modulus of division of said first clock signal.

* * * * *